UNITED STATES PATENT OFFICE.

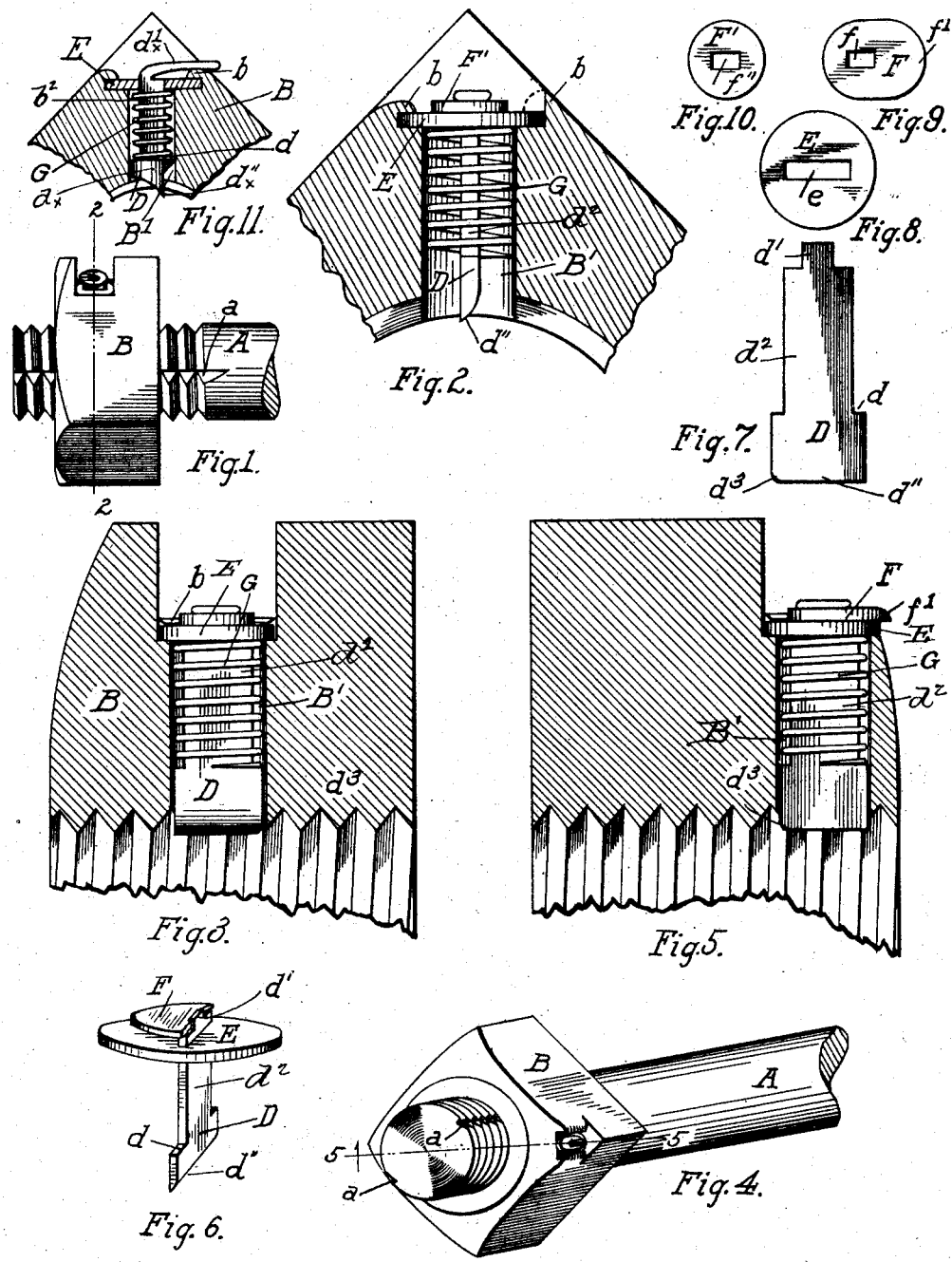

WILLIAM H. BURNETT, OF SPRINGFIELD, ILLINOIS, ASSIGNOR OF ONE-HALF TO WILLIAM L. ENSEL, OF SPRINGFIELD, ILLINOIS.

NUT-LOCK.

No. 866,255.     Specification of Letters Patent.     Patented Sept. 17, 1907.

Application filed October 29, 1906. Serial No. 341,171.

*To all whom it may concern:*

Be it known that I, WILLIAM H. BURNETT, a citizen of the United States, residing at Springfield, in the county of Sangamon and State of Illinois, have invented certain new and useful Improvements in Nut-Locks, of which the following is such a full, clear, and exact description as will enable others skilled in the art to which it appertains to make and use the same.

The invention herein set forth is a modification and improvement of that set forth in United States Patent No. 767203, nut-lock, granted to me Aug. 9, 1904.

The purposes of this invention are to so simplify the construction and arrangement of the parts as to materially reduce the cost of production, and to provide means whereby the dog, housed in a chamber in the nut, may be lifted by the thumb nail to disengage the dog from the grooves in the bolt.

With these ends in view the invention consists in the novel features of construction and combinations of parts shown in the annexed drawings, to which reference is hereby made, and hereinafter particularly described and finally recited in the claims.

Referring to the drawings Figure 1 is a side elevation of the preferable form of the nut-lock; Fig. 2 is an enlarged partial vertical section on the line 2. 2. of Fig. 1; Fig. 3 is an enlarged partial, vertical, axial section through the nut and shows the dog, the spring and the washers in elevation; Fig. 4 is a perspective view of a slightly modified nut-lock; Fig. 5 is an enlarged partial oblique section through the nut on the line 5. 5. of Fig. 4; Fig. 6 is a perspective view of the dog and the washers in position on the dog; Fig. 7 is a side elevation of the dog; Figs. 8, 9 and 10 are top plans of the washers; and Fig. 11 is an enlarged partial transverse section, illustrating a modified construction.

Similar reference letters and numerals designate like parts in the several views.

Referring to my said Patent No. 767203, it will be seen that the nut is provided with a central chamber $d$ and an intersecting channel $e$. A prime purpose of this invention is to dispense with the intersecting channel, which in its production materially enhances the first cost.

The bolt A and the nut B may be of any suitable form and dimensions. The bolt A has longitudinal grooves $a$ extending along the threaded part of the bolt and having an upright wall and an inclined wall such as are in common use. The dog D is housed and slides freely in a circular chamber B′ formed in the body of the nut. The chamber B′ is of two different diameters, the diameter of the main or lower part of the chamber being equal to the greatest width or diameter of the dog D and the diameter of the upper part of the chamber being equal to the diameter of the washer E and greater than the width or diameter of the dog D. The chamber B′ cuts through the corner of the nut and is radial to the bolt A. The forming of the chamber in this way leaves wedged shaped members $b$, of the body of the nut, as clearly shown in Fig. 2.

The dog D may be pressed from a flat metal bar of rectangular cross section and in that case its widest part will fit in the reduced part of the chamber B′, as shown in Figs. 2 and 3; or the dog may have an enlarged cylindrical part $d^\times$ fitting loosely in the reduced part of the chamber B¹ as shown in Fig. 11. The dog has shoulders $d$, an integral tongue $d^1$, an intermediate part $d^2$ and a chisel shaped part $d''$ having one corner cut away as shown at $d^3$. A circular washer E has a central angular opening $e$ in which the intermediate part $d^2$ of the dog slides freely and when the nut is secured in place the opening $e$ prevents the dog from turning. An elliptical washer F has an angular opening $f$ in which the tongue $d'$ of the dog fits, and also has a part $f'$ which projects beyond the end of the nut, as clearly shown in Fig. 5. A coiled spring G surrounds the part $d^2$ of the dog within the chamber B′ and the lower end of the spring lies on the shoulders $d$ and its upper end abuts against the under side of the washer E. The chisel end $d''$ of the dog fits in the grooves $a$ of the bolt. The elliptical washer F may or may not be used, as may be found convenient in practice. If the washer F is not used the tongue $d'^\times$ will be made relatively long and the tongue itself, bent downward and projecting as shown in Fig. 11, will serve as a handle for manipulating the dog.

In assembling the parts the dog D will be placed in the chamber B′, the spring G will be placed on the shoulders $d$; the washer E will then be placed in the enlarged part of the chamber with the body of the dog fitting loosely in the opening $e$; the parts $b$ will then be battered down as shown in Figs. 2 and 11, to overlap the washer E and prevent upward movement of the washer; the washer F if a washer is used, will then be placed on the tongue $d'$ and the tongue will be riveted down on the washer to secure the washer in place on the dog; or if the washer F is not used the elongated tongue $d'^\times$ will be bent downward and will occupy an approximately horizontal position above the washer E and will project somewhat beyond the face of the nut as shown in Fig. 11. When the parts are assembled as described the part $f'$ of the washer F or the end of the tongue $d'^\times$ as the case may be, will project somewhat beyond the end of the nut, or somewhat beyond one face of the nut as the case may be, and by placing the thumb nail under the projecting part and pressing it upward the dog may be slid upward to withdraw the lower end of the dog from the groove in the bolt. In some cases it may be undesirable for the washer F or the tongue $d'^\times$ to project beyond the end or face of the nut, and in such cases a circular nut F′ may be substituted for the elliptical nut F or the tongue $d'^\times$ may be made shorter.

Having fully described my invention what I claim as new and desire to secure by Letters Patent is:

1. The combination of a nut having a chamber enlarged in its upper part and having members adapted to be battered, a washer fixable in the enlarged part of the chamber of the nut by battering the members of the nut and having an angular opening adapted to prevent the turning of a coöperating dog, a dog slidable in the chamber of the nut and having a member slidable in the angular opening through the washer, and provided with means for moving the dog longitudinally outward in the angular opening, and shoulders adapted to accommodate a spring, and a spring surrounding the member of the dog between the washer and the shoulder of the dog and acting to slide the dog inward.

2. The combination of a grooved bolt, a nut fitting on the bolt and having a circular chamber enlarged in its upper part and also having wedge shaped members adapted to be battered, a dog slidable in the chamber of the nut and having shoulders and a tongue and having a part formed to fit in the grooves of the bolt, a circular washer secured in the enlarged part of the chamber by the battered wedge-shaped members of the nut and having an opening preventing the turning of the dog, a spring bearing against the shoulders of the dog and against the under side of the circular washer, and a washer secured on the tongue of the dog and projecting beyond the nut.

3. The combination of a nut having a chamber enlarged in its upper part and having wedge-shaped members adapted to be battered; a washer having an angular opening and secured in the enlarged part of the chamber by the battered wedge-shaped members of the nut; a dog having a tongue adapted for riveting also having an angular member slidable in the angular opening of the washer, shoulders adapted to accommodate a spring and a chisel-shaped member adapted to fit in the channel of a longitudinally channeled bolt on which the nut fits; a spring surrounding the dog between the said washer and the shoulders of the dog and a second washer fitting and riveted on the tongue of the dog.

In witness whereof I have hereunto subscribed my name at Springfield Illinois, this 8th day of October 1906.

WILLIAM H. BURNETT.

Witnesses:
O. A. MERKEL,
R. H. DOOLING.